(12) United States Patent
Roberts

(10) Patent No.: US 12,061,551 B2
(45) Date of Patent: Aug. 13, 2024

(54) TELEMETRY-CAPABLE MEMORY SUB-SYSTEM

(71) Applicant: Micron Technology, Inc., Boise, ID (US)

(72) Inventor: David Andrew Roberts, Wellesley, MA (US)

(73) Assignee: Micron Technology, Inc., Boise, ID (US)

( * ) Notice: Subject to any disclaimer, the term of this patent is extended or adjusted under 35 U.S.C. 154(b) by 40 days.

(21) Appl. No.: 17/896,883

(22) Filed: Aug. 26, 2022

(65) Prior Publication Data

US 2024/0070072 A1 Feb. 29, 2024

(51) Int. Cl.
*G06F 12/0815* (2016.01)

(52) U.S. Cl.
CPC .. *G06F 12/0815* (2013.01); *G06F 2212/1032* (2013.01); *G06F 2212/305* (2013.01)

(58) Field of Classification Search
CPC ......... G06F 12/0815; G06F 2212/1032; G06F 2212/305
See application file for complete search history.

(56) References Cited

U.S. PATENT DOCUMENTS

| | | | | |
|---|---|---|---|---|
| 2012/0330802 | A1* | 12/2012 | Guthrie | G06Q 50/10 711/119 |
| 2015/0039833 | A1* | 2/2015 | Chang | G06F 12/0848 711/129 |
| 2016/0062660 | A1 | 3/2016 | Kunimatsu et al. | |
| 2016/0071608 | A1 | 3/2016 | Bronner et al. | |
| 2018/0081569 | A1 | 3/2018 | Kan et al. | |
| 2018/0107598 | A1* | 4/2018 | Prodromou | G06F 12/0811 |
| 2019/0073314 | A1 | 3/2019 | Coburn et al. | |
| 2021/0357329 | A1* | 11/2021 | Oh | G06F 12/0891 |
| 2022/0100668 | A1* | 3/2022 | Blagodurov | G06F 12/0815 |
| 2022/0179577 | A1 | 6/2022 | Muchherla et al. | |

OTHER PUBLICATIONS

Irina Calciu et al., "Project PBerry: FPGA Acceleration for Remote Memory," HotOS '19, May 13-15, 2019, Bertinoro, Italy, 9 pages.
Moinuddin K. Qureshi et al., "Enhancing Lifetime and Security of PCM-Based Main Memory with Start-Gap Wear Leveling," IEEE Xplore, pp. 14-23.
Moinuddin K. Qureshi et al., "Morphable Memory System: A Robust Architecture for Exploiting Multi-Level Phase Change Memories," pp. 153-162.
Simon D. Hammond et al., "Multi-Level Memory: What You Add Is More Important Than What You Take Out," Sandia National Laboratories, SAND2016-9772C, 16 pages.
Wikipedia, "MESI Protocol," downloaded on Aug. 23, 2002 at: https://en.wikipedia.org/wiki/MESI_protocol, 9 pages.
International Search Report and Written Opinion for International Application No. PCT/US2023/031095, mailed Dec. 5, 2023, 9 Pages.

* cited by examiner

*Primary Examiner* — Edward J Dudek, Jr.
(74) *Attorney, Agent, or Firm* — LOWENSTEIN SANDLER LLP

(57) ABSTRACT

An access counter associated with a segment of a memory device is maintained. An access notification for a first line of the segment is received. An access type associated with the access notification is identified. A first value of the access counter is changed by a second value based on the access type. Based on the first value of the access counter, a memory management scheme is implemented.

20 Claims, 6 Drawing Sheets

TELEMETRY-CAPABLE MEMORY SUB-SYSTEM

TECHNICAL FIELD

Embodiments of the disclosure relate generally to memory sub-systems, and more specifically, relate to telemetry-capable memory sub-systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
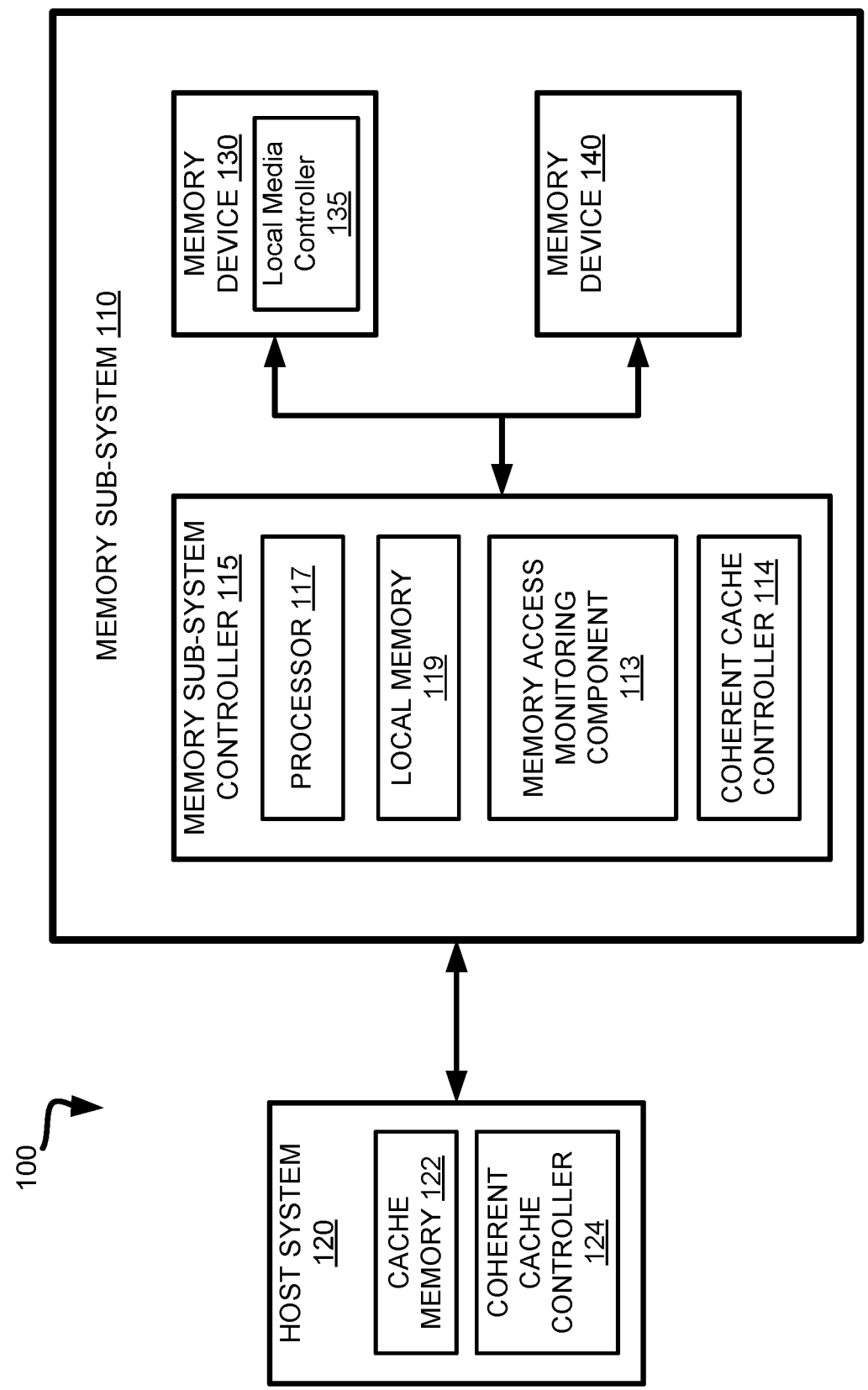
FIG. 1 illustrates an example computing system that includes a memory sub-system in accordance with some embodiments of the present disclosure.

Aspects of the present disclosure are directed to telemetry-capable memory sub-systems. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. A non-volatile memory device is a package of one or more dies. Each die can include of one or more planes. For some types of non-volatile memory devices (e.g., NAND devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are etched formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Depending on the storage architecture employed, data can be stored across the memory planes (i.e., in stripes). Accordingly, one request to read a segment of data (e.g., corresponding to one or more data addresses), can result in read operations performed on two or more of the memory planes of the memory device.

Memory telemetry can be used by the host system and/or by the memory sub-system controller to optimize memory usage. Memory telemetry can include memory access statistics, such as a frequency of access metric (i.e., a memory access count), or a reuse distance metric (i.e., a number of distinct memory accesses made by multiple memory references to the same location). The host system and/or the memory sub-system controller can use memory access statistics to implement a variety of optimizing mechanisms, such as to optimize page scheduling (e.g., to guide data placement by relocating heavily accessed pages to faster memory devices to improve performance), to optimize memory-usage by applications running on the host system, to optimize virtual machine (VM) provisioning, to optimize security monitoring among other applications, etc. Memory telemetry can also be used for memory management, such as to decide what size of on-chip cache or off-chip (e.g., DRAM) page cache should be used. For example, using memory telemetry, the host system and/or the memory sub-system controller can sort the moveable memory segments in order of access frequency or access count. The host system and/or the memory sub-system controller can periodically reorganize the moveable memory segments so that the most frequently accessed segments are placed in the fastest memory type. The segments that are less frequently accessed can be placed in a slower memory device that are generally higher capacity and less expensive.

Memory semantic protocols, such as compute express link (CXL), Gen-Z, or RapidIO, enable telemetry-capable memory sub-systems to monitor and process memory access statistics (i.e., memory telemetry). That is, telemetry-capable memory sub-systems can use CXL, Gen-Z and/or RapidIO protocols to enable telemetry capabilities. However, these telemetry-capable memory sub-systems are limited to monitoring the memory within the memory sub-system. In conventional telemetry-capable memory sub-systems, the sub-system controller can only identify memory access requests directed to memory devices within its memory sub-system. Computing systems can include multiple memory sub-systems, and conventional telemetry-capable memory sub-systems do not monitor external memory regions (i.e., memory that is not within the telemetry-capable memory sub-system). Thus, conventional telemetry-capable memory sub-systems do not provide a system-view of memory access statistics.

Some host systems and/or not telemetry-capable memory sub-system controllers can keep track of memory regions that have been recently accessed. For example, some host systems measure memory access metrics using a single-bit entry in a page access table to indicate which pages have been recently accessed. Because such page access tables only show whether a page has been recently accessed, they do not provide an accurate view of memory access frequency or memory access counts. Host systems may not have the capacity or bandwidth to monitor the access frequency for the entire system.

Aspects of the present disclosure address the above and other deficiencies by having a telemetry-capable memory sub-system that can provide a system-wide view of memory activity using cache-coherent memory device interconnect protocols. A telemetry-capable memory sub-system is connected to a host system and/or to other memory sub-systems via an interface that supports cache coherent capabilities. Cache coherent capabilities ensure that changes to memory blocks that are shared among multiple processors (e.g., shared among the host system and/or one or more memory sub-systems) are propagated throughout the system. The host system can include a cache memory and a host-side coherency controller. The memory sub-system can include a memory-side coherency controller, which can track the coherent state of cache lines using state tables in memory. A cache line is a chunk of memory handled by the cache, e.g., 32 bytes, 64 bytes, or 128 bytes of data. The controller of a telemetry-capable memory sub-system can use cache coherent protocols to force other processors to notify the controller when access is made to a line that the controller is monitoring, thus enabling the controller to maintain an accurate access counter for the segment.

The memory sub-system controller can maintain an access counter for each segment of a memory region that the memory sub-system controller monitors. A memory region can be, for example, a memory device, or part of a memory device. A segment can be, for example, a page, a block, a superblock, or some other segment of the memory region. The memory sub-system controller can monitor memory regions within the memory sub-system, and/or external memory regions (e.g., memory regions that part of another memory sub-system connected to the same host, or memory regions that are directly connected to the host system, e.g., high bandwidth memory). To monitor memory regions that are external to the memory sub-system on which the memory sub-system controller operates, the memory sub-system controller can implement cache coherent protocols that enable the memory sub-system controller to receive access notifications directed to external memory regions. Thus, the memory sub-system controller can maintain an accurate access count for the regions it monitors.

In order to receive access notifications for external memory regions, the memory sub-system controller can request ownership of one or more lines of each segment of a memory region. Having ownership of a line of a segment enables the memory sub-system controller to be notified when access to the line is requested by another system (e.g., by the host system). That is, if the host system accesses the line (e.g., by issuing a read or a write request referencing the line), it sends an access notification to the current owner of the line. Following the receipt of an access notification, the memory sub-system controller increases the counter associated with the segment, and releases ownership of the line. The memory sub-system controller can then request ownership of another line of the segment in order to monitor a consistent number of lines of each segment at once. While the memory sub-system controller can monitor any number of lines of each segment, the number of lines monitored should remain consistent.

The memory sub-system controller can monitor a subset of lines within each segment. In order to provide an accurate count for the entire segment, the memory sub-system controller can increase the access counter by a value that is based on the type of access and/or based on the number of lines being monitored at once. For example, when monitoring segments that are not shared with other processors, to generate an accurate segment access counter, the memory sub-system controller can manipulate the access counter by a value weighted based on L/N, where L represents the number of lines in each segment, and N represents the number of lines being monitored (i.e., the number of lines in the subset). When the memory sub-system controller monitors lines that may be shared by other processors, the memory sub-system controller can manipulate the access counter by a value that is weighted based on the access type and/or the state of the line being monitored. The access type can be, for example, a processor read or write which originated from within the memory sub-system, or a bus read, bus write, or bus upgrade, which originated from a source external to the memory sub-system. The state of the line can be, for example, modified, exclusive, shared, or invalid. Since different actions are required based on the state of the line and the access type, the weighting factor can be dependent on the state of the line and the access type.

The memory sub-system controller can then transmit the access counter values to the host system. In some embodiments, the memory sub-system controller can combine access counter values from other sources with its own access counter values. For example, a computing system can have multiple telemetry-capable memory sub-systems, in which case the memory sub-system controller can combine the access counter values generated by the multiple telemetry-capable memory sub-systems. The memory sub-system controller and/or the host system can compare the system-wide memory activity to make system-level data management decisions.

In some embodiments, the memory sub-system controller can implement a variety of memory management schemes to optimize memory usage based on the access counter values. The memory management schemes can include, for example, data placement techniques, page scheduling techniques, application optimization techniques, application security monitoring techniques, VM provisioning techniques, and/or cache sizing techniques. The memory management schemes can optimize memory usage, thus increasing performance of the computing system as a whole, and increasing performing of application usability.

Advantages of the present disclosure include, but are not limited to, generating and providing an accurate, system-wide view of memory behavior, thus enabling more accurate memory management capability. For example, an accurate system-wide view of memory behavior improves data placement throughout the entire computing system. Furthermore, improved data placement leads to improved overall performance of the memory sub-system. For example, overall performance of the memory sub-system can be improved by moving frequently accessed data to fast memory devices, and moving infrequently accessed data to slow memory devices. Having an accurate and system-wide view of memory activity and behavior significantly improves the identification of frequently accessed and infrequently accessed data, therefore improving the overall memory management. Furthermore, aspects of the present disclosure can be implemented by a telemetry-capable memory sub-system, with no changes required on the host system. The overhead resources used to implement aspects of the present disclosure are minimized by monitoring a subset of each memory segment, and extrapolating the telemetry data to generate an accurate system-wide view.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a memory access monitoring component 113 that can generate accurate system-wide memory access statistics. In some embodiments, the memory sub-system controller 115 includes at least a portion of the memory access monitoring component 113. In some embodiments, the memory access monitoring component 113 is part of the host system 120, an application, or an operating system. In other embodiments, local media controller 135 includes at least a portion of memory access monitoring component 113 and is configured to perform the functionality described herein.

The memory access monitoring component 113 can monitor accesses to memory devices 130, 140, and/or to other memory connected to the host system 120. The memory access monitoring component 113 can implement coherent and/or non-coherent monitoring. Non-coherent monitoring monitors data access requests directed to physical addresses within the memory sub-system 110 without using cache coherence protocols. Such requests are non-coherent requests, when the memory sub-system 110 is not configured to participate in a coherent protocol with the host system 120. Non-coherent monitoring does not extend to memory regions external to the corresponding memory sub-system 110. The memory access monitoring component 113 can perform coherent monitoring using cache coherent protocols. Cache coherent protocols enable the memory access monitoring component 113 to extend its monitoring to memory external to the correspond memory sub-system 110. Coherent monitoring counts requests to addresses irrespective of whether there is a resulting cache hit or miss.

To implement non-coherent monitoring, the memory access monitoring component 113 can provide telemetry functions (statistics) to a host system 120, and/or can perform the more advanced telemetry functions involving data movement and/or manipulation itself. In order to perform the advanced telemetry functions that include data movement, the memory sub-system 110 should have fixed-function or programmable control logic and shared memory access (e.g., the memory sub-system controller 115 can copy data within the memory sub-system 110 with or without intervention from the host system 120). Non-coherent monitoring enables the memory access monitoring component 113 to monitor address ranges on local memory (e.g., memory devices 130, 140) for read and write commands. The memory access monitoring component 113 can then increase access counters responsive to identify read and/or write commands, according to the non-coherent telemetry functions described below. The access counters can be maintained by memory access monitoring component 113 in local memory 119. The access counters stored in local memory 119 can be private, or can be readable as shared memory to the host system 120 (and/or to other devices). Additionally or alternatively, the access counters can be stored in a shared portion of a cache, or in a dedicated statistics cache.

The non-coherent telemetry functions can include, for example, a page access frequency tracking function and/or a stack distance monitoring (MINION) function. To implement the page access frequency tracking function, the memory access monitoring component 113 can maintain an array of counters. The memory access monitoring component 113 can maintain an array for each range of segments being monitored, for example. The counters can be separated for read commands and write commands, or can combine read commands and write commands. The array can include one counter per segment (e.g., per page monitored). Note that the size of the array is configurable.

Using the non-coherent page access frequency tracking function, the memory access monitoring component 113 can initialize the counters. In some embodiments, the memory access monitoring component 113 can reset all associated counters (e.g., responsive to receiving a command from the host system 120). The page access frequency tracking function enables the memory access monitoring component 113 to increase the corresponding counter value responsive to each read and/or write directed to the monitored segment (e.g., page). In some embodiments, the page access frequency tracking function can enable the memory access monitoring component 113 to perform processing of the array of counters, which may then be queried by the host system 120. Processing the counter values can include generating a sorted list of page addresses by access count, which the host system 120 can then use in page scheduling to move frequently accessed pages to fast memory. Processing the counter values can include invoking a page scheduling policy and returning, to the host system 120, a list of predicted frequently accessed pages (e.g., "hot" pages) and a list of predicted infrequently accessed pages (e.g., "cold" pages). In processing the counter values, the memory access monitoring component 113 can implement a variety of page scheduling approaches, such as for example, algorithmic, manual, or automatic page scheduling to implement multi-level memory. For example, using the counter values, the memory access monitoring component 113 can identify memory access cluster centers and memory access trends, and adjust the threshold levels used in an automatic page scheduling scheme.

In some embodiments, the memory access monitoring component 113 implements a memory management scheme to optimize memory usage throughout the entire system 100. For example, the memory access monitoring component 113 can rearrange the moveable memory segments according to the generated list of predicted frequently accessed segments (e.g., "hot" pages) and a list of predicted infrequently accessed segments (e.g., "cold" pages). As another example, the memory access monitoring component 113 can optimize data placement for an application running on host system 120, by analyzing the access frequency for the application data and moving frequently accessed data to faster memory devices. The memory management schemes, which can be implemented by the host system 120 and/or the memory access monitoring component 113, can include page scheduling techniques, application optimization techniques, security monitoring techniques, virtual machine provisioning techniques, and/or cache sizing techniques, for example.

The non-coherent stack distance monitoring function logically divides the memory segments (e.g., pages) into logical rows of N columns (e.g., 64 columns). The stack distance monitoring function enables the memory access monitoring component 113 to implement a memory monitoring circuit (MINION) to track a subset of the rows recency position counters. Stack distance monitoring function calls to the telemetry-capable memory sub-system 110 use this data to estimate the hit rate given a cache of specified capacity, or directly provide that data to the host system 120 without post-processing. The memory access monitoring component 113 can then transmit the memory telemetry (e.g., the estimated hit rate) to the host system 120, and the host system 120 can manage the memory based on the transmitted memory telemetry.

Coherent monitoring, on the other hand, enables the memory access monitoring component 113 to extend the monitoring to all memory connected to host system 120 (i.e., to memory external to the telemetry-capable memory sub-system 110). The memory access monitoring component 113 can implement cache coherent protocols that compel the host system 120 to notify the memory access monitoring component 113 of reads and writes directed to external memory that the memory access monitoring component 113 is monitoring. In embodiments, coherent writes are implements using a read for ownership command, which forces eviction of copies of the line from all caches, thus enabling the new owner to modify the line (i.e., implement the write). This monitoring can enable accurate, system-wide page scheduling at the memory sub-system 110. One example of a cache coherence protocol is the MESI protocol. It should be noted that any cache coherence protocol can be used. The coherence protocol states and messages can be mapped onto protocol-specific equivalent message types (e.g., in CXL or Gen-Z).

The memory access monitoring component 113 can maintain an access counter for each segment of memory that it monitors, and can increase the corresponding access counter each time a segment is accessed. The memory access monitoring component 113 can monitor entire segments, or can monitor a subset of each segment. For instance, the memory access monitoring component 113 can monitor a number of cache lines of each segment. The memory access monitoring component 113 can then increase the access counter by a value (which can be adjusted based on a weighting factor) to generate an accurate system-wide view of the memory accesses. Cache lines within a segment often have similar access behavior, thus monitoring a subset of lines and generating a segment access counter using a weighting factor can generate an accurate view of the segment as a whole. The memory access monitoring component 113 can randomly and/or exhaustively select different lines to track over time, thus uniformly capturing a view of all the lines in each segment.

The weighting factor can be based on the type of access, on the state of the line being monitored, and/or on the number of lines being monitored by the memory access monitoring component 113. The type of access can be a processor read (for ownership or for shared access), a processor write, a bus read, a bus write, or a bus upgrade, for example. Processor reads and processor writes originate from a host system 120 or near-data processing logic (e.g., processor 117) within the memory sub-system 110. The memory access monitoring component 113 is aware of each read and write command that originates from within memory sub-system 100. Thus, the memory access monitoring component 113 can increase the access counter corresponding to the accessed segment by an unweighted value (e.g., a factor of "one"). That is, the memory access monitoring component 113 does not need to weight the increasing value for commands that originate within the memory sub-system 110, since each such command is counted.

However, for accesses made responsive to a coherence messages such as a bus read, a bus write, or a bus upgrade command (or for other commands that originate from a system other than the memory sub-system 110), the memory access monitoring component 113 can adjust the increasing value for the corresponding access counter. The increasing value is weighted by a weighting factor to avoid having to monitor every line of each segment of the external memory. That is, the weighting factor compensates for the cases when the memory access monitoring component 113 monitors a subset of each segment of external memory. The weighting factor is described in further detail with respect to FIG. 3B.

In order to monitor memory regions external to the memory sub-system 110 on which the memory sub-system controller 115 operates, the host system 120 can include a cache memory 122 and a coherent cache controller 124. The memory sub-system 110 can include a coherent cache controller 114, and can optionally include a cache memory (not pictured). In some embodiments, the memory access monitoring component 113 can perform the functions of the coherent cache controller 114. In instances in which the memory sub-system 110 does not include a cache, the coherent cache controller 114 can track the coherent state of cache lines using state tables in memory (e.g., in local memory 119). An example of a telemetry-capable memory sub-system that does not include a cache is described with respect to FIG. 2.

The coherent cache controllers 124, 114 can implement one of a variety of cache coherent protocols to ensure that changes in the values of shared data are propagated throughout the computing system 100. The cache coherent protocol can enable the memory access monitoring component 113 to request ownership of a line of the segment which it is monitoring. The memory access monitoring component 113 can identify memory access requests directed to memory within the memory sub-system 110. When the memory access monitoring component 113 has ownership of a line of a segment in memory that is external to the memory sub-system 110, the memory access monitoring component 113 receives a notification when that line of the segment is accessed. Thus, by monitoring memory external to the memory sub-system 110 using cache coherent protocols, the memory access monitoring component 113 can maintain an accurate count of the accesses made to all memory within the system 100. Note that functions responsive to monitored accesses are not limited to access counting.

In some embodiments, in order to acquire ownership of a line, the memory access monitoring component 113 can send a read for ownership operation directed to the line. The read for ownership operation usually indicates the processor's intent to write to the memory address, and can cause all other caches in the cache coherency protocol to write any modified data back to memory and set the state of the line to invalid. When another processor sends a write command directed to the line (which can include a read for ownership operation), the memory access monitoring component 113 releases ownership of the line. In some embodiments, releasing ownership of the line can happen automatically in response to receiving an intent to modify the line from another processor. In some embodiments, the memory access monitoring component 113 can release ownership of changing the state of the line referenced by the memory address to modified or shared. In some embodiments, the memory access monitoring component 113 can maintain a cache coherence directory data structure. The cache coherence directory data structure can maintain the state of a line, such as invalid, shared, modified, exclusive, and/or owned. The memory access monitoring component 113 can indicate which lines are owned using the cache coherence directory data structure, and can release a line by sending a notification to other caches that have a copy of the line, then updating the state of the line in the cache coherence directory data structure.

The coherent cache controller 114, 124 can include a software application programming interface (API), which can enable the host system 120, another telemetry-capable memory sub-system, and/or another processor to configure, control, and query the telemetry-capable memory sub-system 110. The API can configure regions and extents to be monitored. A region is a contiguous range of physical addresses. The memory sub-system 110 monitors telemetry for this region. For non-coherent monitoring, the physical addresses exist on the memory sub-system 110. For coherent monitoring, the physical addresses can exist either on the memory sub-system 110, or on any other addressable on-chip or off-chip memory device in the system 100. An extent is a contiguous range of physic addresses within a region that may be combined in a list, thus allowing gaps between extents. Extents can represent software-defined memory ranges that will be monitored in a region. A monitor ID can be a unique handle or pointer to statistics related to a set of extents or with a process ID. The memory sub-system controller 115 can maintain a data structure associating the monitor ID with a process ID, and/or with a set of telemetry counters associated with the range of physical addresses.

The API can include a set of functions that enable configuring, controlling, and/or querying the telemetry-capable memory sub-system 110. For example, a telemetry enable function validates that each extent being monitored is within a region configured by the host system 120's operating system, enables telemetry of the specified type (e.g., access frequency counting at a specified granularity, reuse distance monitoring at a specified granularity, etc.), initializes counter arrays and reserves other temporary working storage on the device, and returns a handle (e.g., the monitor ID) for configuration of and access to telemetry features and data. The telemetry enable function can also set up telemetry tracking associated with a specified process ID referenced by request packets, rather than for a specified set of extents. In some embodiments, the two parameters can be combined, and the telemetry-capable memory sub-system 110 can monitor extents associated with the specified process ID.

Examples of additional API functions include allowing adding extents to monitor during operation, resetting statistics associated with a specified monitor ID, pausing telemetry counter updates, saving a snapshot of current telemetry data to a buffer, freeing all counters and temporary resources associated with a specific monitor ID, and/or invoking a higher-level telemetry post-processing function to assist memory management. The higher-level telemetry post-processing function can include, for example, receiving a sorted and unsorted segment access frequency histogram, receiving a segment schedule using a scheduling policy (e.g., a page schedule that lists blocks to migrate to each memory type), receiving an expected hit rate for a given cache size from reuse distance monitor, and/or receiving the cache size needed to reach a given hit rate from reuse distance monitor. In some embodiments, the snapshot function can flip all telemetry counters to an empty, pre-initialized set of counters, preserving the existing state to be read out by higher-level telemetry functions in the host system 120 or the memory sub-system 110. The snapshot function can ensure that statistics for all data blocks represent a consistent snapshot in time, and that no time periods are missed.

To extend the stack distance monitoring telemetry to cache coherent memory, the memory access monitoring component 113 implements a similar technique of owning a subset of lines of each monitored segment (e.g., page). To reduce error caused by the sparsity of visible lines, the coherent stack distance monitoring function can monitor a larger subset of external address ranges than the subset used for the access counters. Then, rather than using the MINION recency list for each logical row of pages on every request (as is used for non-coherent monitoring), the coherent stack distance monitoring function can trigger recency updates for processor read, processor write, bus read, bus write, or bus upgrade commands directed to an owned lined within the monitored address range. That is, coherent stack distance monitoring can monitor addresses anywhere in the computing system 100, while non-coherent stack distance monitoring can monitor addresses within the memory sub-system 110.

Further details with regards to the operations of the memory access monitoring component 113 are described below.

Figure 2:
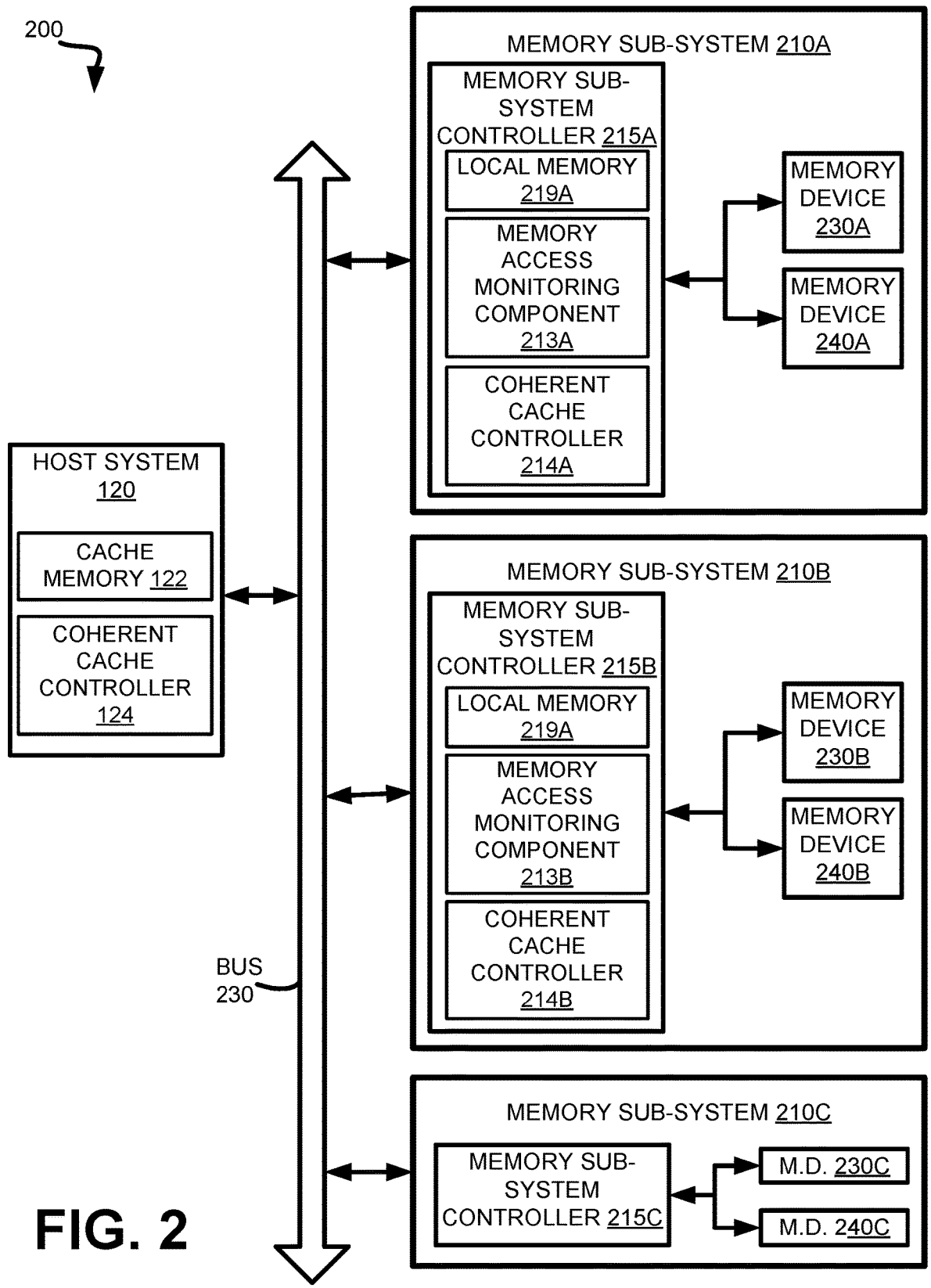
FIG. 2 illustrates an example computing system that includes multiple memory sub-systems, in accordance with some embodiments of the present disclosure.

FIG. 2 illustrates an example computing system 200 that includes multiple memory sub-systems 210A-C, in accordance with some embodiments of the present disclosure. Memory sub-systems 210A-C can have similar features to memory sub-system 110 of FIG. 1. A bus 230 connects host system 120 to multiple memory sub-systems 210A-C. Note that more than or fewer than 3 memory sub-systems can be connected to host system 120. In some embodiments, the computing system 200 can be a snooping system, in which the memory sub-systems 210A-C on the bus 230 monitor (or snoop) the bus transactions. Each memory sub-system controller 215A-C has a copy of the sharing status of each segment of physical memory to which it has access (either by storing the segment in its corresponding memory sub-system 210A-C, or by requesting ownership of the segment, or a subset thereof).

As illustrated in FIG. 2, memory sub-systems 210A-B are telemetry-capable memory sub-systems, and include a memory access monitoring component 213A-B. Memory sub-system 210C is not a telemetry-capable memory sub-system, and thus does not include a memory access monitoring component. Note that even though memory sub-system 210C is not telemetry-capable, its memory accesses can be monitored by the coherent memory access monitoring component of memory sub-system 210A and/or 210B. Memory access monitoring components 213A-B can perform the same functions as memory access monitoring component 113 of FIG. 1. In some embodiments, memory sub-system controllers 215A,B include a coherent cache controller 214A,B. Coherent cache controller 214A,B can perform the same functions as coherent cache controller 114 of FIG. 1. In some embodiments, memory access monitoring components 213A-B perform the functions of coherent cache controller 214A,B.

In some embodiments, the telemetry-capable memory sub-systems 210A-B can include a cache (not pictured). In embodiments in which the memory sub-system 210A,B includes a cache, the monitored (i.e., owned) lines could be cached in the corresponding memory sub-system 210A,B for tracking purposes. In some embodiments, the telemetry-capable memory sub-systems 210A-B do not include a cache. In such embodiments, when the corresponding memory access monitoring component 213A,B requests ownership of a line, it does not cache the line. Rather, the memory access monitoring component 213A,B can maintain a coherence directory when monitoring addresses stored in the corresponding memory sub-system 210A,B. The memory access monitoring component 213A,B can introduce an additional state of the line in the coherence directory, e.g., called "Device-Owned-Local." This new state indicates that that corresponding memory sub-system 210A,B has ownership of the corresponding line, but it may not currently be stored to a cache on the memory sub-system 210A,B. If an incoming coherence probe results in a cache miss on the memory sub-system 210A,B, the coherence directory can be checked to determine whether the memory sub-system 210A,B owns the line. Note that if an access to a line labeled "Device-Owned-Local" occurs that results in the line being cached, the data can be copied into the corresponding memory sub-system cache.

For telemetry-capable memory sub-systems 210A,B operating without a cache and monitoring addresses external to the corresponding memory sub-system 210A,B, the memory access monitoring component 213A,B can introduce an additional state associated with the remote address, e.g., called "Device-Owned-Remote." The Device-Owned-Remote state can be stored in a metadata table in the corresponding memory sub-system 210A,B. When the memory access monitoring component 213A,B acquires ownership of a line and does not write it to a local cache, the memory access monitoring component 213A,B can force the data to be written back to the remote memory after gaining ownership to ensure memory consistency. When the host next requests the data (i.e., when the memory access monitoring component 213A,B receives an access notification for the line, e.g., by identifying an incoming BusRd or BusRdX command), the corresponding memory access monitoring component 213A,B can perform a proxy read by reading the line from memory and forwarding the data as a response. Additionally or alternatively, the memory access monitoring component 213A,B can hold the data stored at the owned line in a reserved portion of memory on the corresponding memory sub-system 210A,B, e.g., in a hash table indexed by physical address.

In some embodiments, the host physical address space can be mapped across all memory sub-systems 210A-C without interleaving. In such instances, each telemetry-capable memory sub-system 210A-B can be responsible for monitoring a separate physical address range. The results of the memory monitoring from each memory access monitoring component 213A-B can be appended to each other to provide a system-wide view of the memory telemetry. In some embodiments, the host system 120 can combine the memory monitoring telemetry provided by each memory access monitoring component 213A-B. In some embodiments, one of the memory access monitoring components 213A-B can combine the results from each of the memory access monitoring components 213A-B, and transmit the combined memory telemetry to host system 120.

In some embodiments, the host physical addresses are interleaved at a fine granularity (e.g., 4 KB pages can be interleaved across telemetry-capable memory sub-systems 210A-B, and each memory sub-systems 210A-B has access to 2 KB). Each memory sub-systems 210A-B can monitor its interleaved memory space, and telemetry from each memory sub-systems 210A-B can be combined to generate a system-wide view of the memory access telemetry. Either the host system 120 and/or one of the memory sub-systems 210A-B can combine the access statistics from each memory sub-systems 210A-B.

One of (or both) memory sub-systems 210A-B can maintain a data structure (e.g., a table) to associate addresses of incoming access requests with a set of statistics. Each entry in the data structure can be associated with a structure ID, referencing an array of telemetry counters in a memory on the device (e.g., in local memory 219A-B). In some embodiments, a part of the address or a field in the request packet can include a process ID or a virtual machine (VM) ID to indicate the set of telemetry counters associated with the request.

Telemetry-capable memory sub-systems 210A-B can see each data access request directed to memory devices within the corresponding memory sub-system 210A-B. Data access requests directed to memory within the corresponding memory sub-system 210A-B can be monitored using either coherent or non-coherent implementations. Data access requests directed to remote memory (e.g., memory external the corresponding memory subsystem 210A or 210B) can be monitored using a coherent implementation. The non-coherent implementation does not implement cache coherent mechanisms, and as a result, the corresponding memory access monitoring component 213A,B can increase the appropriate access counter by a value of "1" in response to each identified access request. That is, the value by which to increase the access counter need not be weighted.

In some embodiments, the memory access monitoring component 213A,B can apply cache coherent mechanisms. To apply cache coherent mechanisms, the memory access monitoring component 213A,B can request ownership of a subset of lines each monitored segment of memory. Responsive to receiving an access notification directed to a line within the subset, the memory access monitoring component 213A,B can release ownership of the line, increase the counter (using an appropriate weighting factor), and request ownership of another line within the segment. The weighting factor can be dependent on the type of access and/or the state of the line. The weighting factor is further described with respect to FIG. 3B.

One or more of the telemetry-capable memory sub-system controllers 215A,B, and/or host system 120, can implement a variety of memory management schemes in order to optimize memory usage throughout the computing system 200. The memory management schemes can include using the weighted access counter values to optimize data placement (e.g., by implementing a page scheduling technique), to optimize the applications running on host system 120, to optimize VM provisioning, to optimize security monitoring of the applications running on the host system 120, and/or to optimize cache sizing throughout the system 200.

Figure 3A:
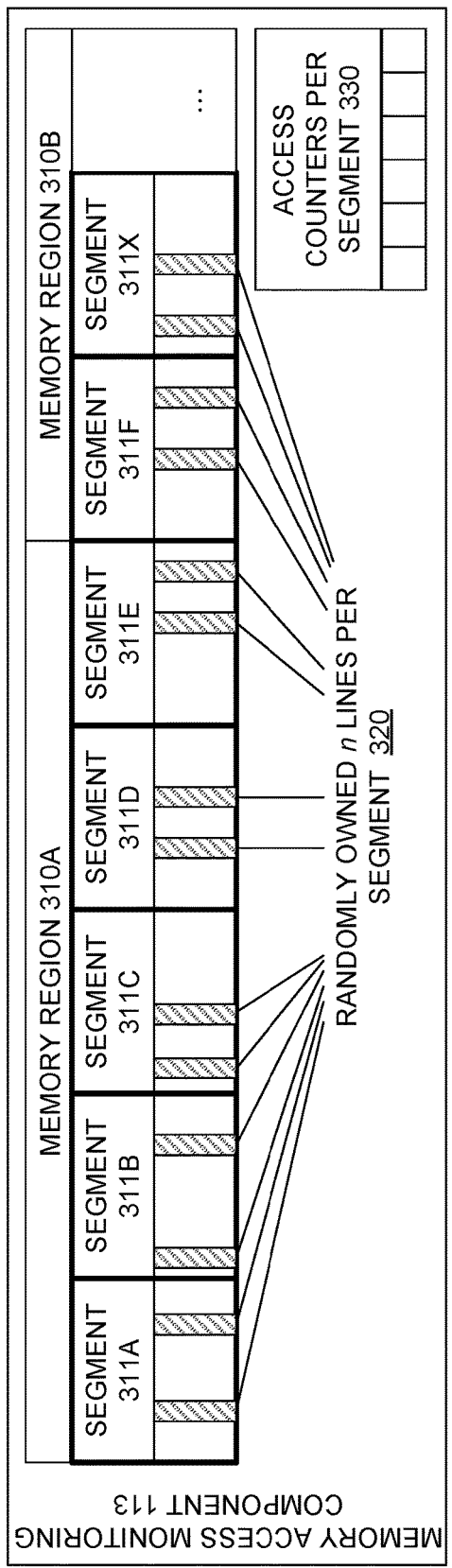
FIG. 3A and FIG. 3B illustrate example memory regions monitored by a memory access monitoring component, in accordance with some embodiments of the present disclosure.
Figure 3B:
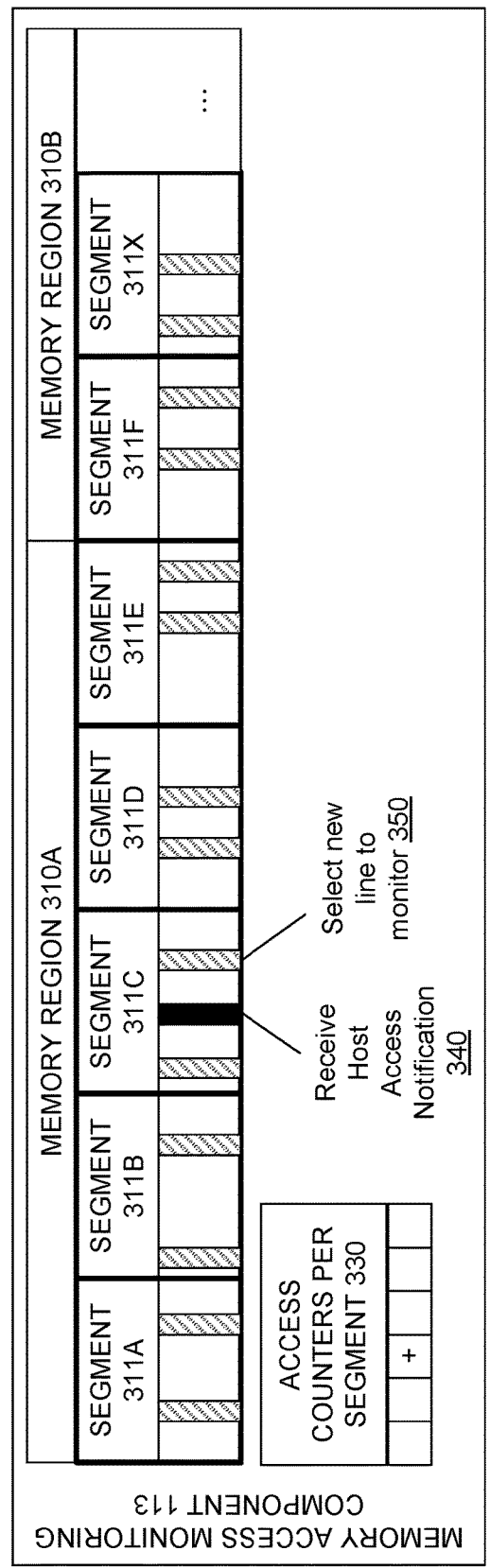

FIGS. 3A, 3B illustrate example memory regions 310A-B monitored by a memory access monitoring component 113, in accordance with some embodiments of the present disclosure. Memory access monitoring component 113 of FIGS. 3A, 3B can have access to memory regions 310A-B through cache coherent protocols. FIG. 3A illustrates the initial state of memory access monitoring component 113, in accordance with some embodiments of the present disclosure. In an initial state, memory regions 310A-B can be mapped into the host system's physical address space. Memory regions 310A-B can reside in telemetry-capable memory sub-systems (e.g., memory sub-systems 210A,B of FIG. 2), not telemetry-capable memory sub-systems (e.g., memory sub-system 210C of FIG. 2), and/or direct-attached host memory. In some embodiments, the memory sub-system on which memory access monitoring component 113 operates has a local cache, which is a peer to the host cache (e.g., cache 122 of FIGS. 1 and 2). During telemetry initialization, the memory access monitoring component 113 acquires ownership of a number n of cache lines per segment 311A-X. In some embodiments, segments 311A-X can each be one page. In embodiments in which the segments are interleaved across multiple telemetry-capable memory sub-systems 210A-B, the memory access monitoring component 113 acquires ownership of a number n of cache lines per partial segment (i.e., the part of the segment which the corresponding memory sub-system is monitoring). The memory access monitoring component 113 can acquire ownership of a number n of cache lines per segment 311A-X using a "read for ownership" command (such as BusRdX command). The n cache lines for which the memory access monitoring component 113 has acquired ownership are illustrated in FIG. 3A as the randomly owned n lines per segment (320). The number of lines n per segment 311A-X can an integer between 1 and the total number of lines per segment 311A-X.

The number n of lines per segment 311A-X for the memory access monitoring component 113 has acquired ownership can be a subset of the total number of lines per segment 311A-X, and can be predefined by the memory sub-system controller. Since cache lines within a segment 311A-X often have similar access behavior, monitoring a subset of the lines in a segment 311A-X is sufficient to generate an accurate view of the segment as a whole. By monitoring a subset of the lines in each segment 311A-X, rather than monitoring entire segments 311A-X, the performance overhead is reduced. In some embodiments, the n lines per segment are randomly selected. In some embodiments, the memory access monitoring component 113 can keep track of lines selected, and can avoid repeatedly selecting the same line within a certain time period. For example, to get a provably uniform but spatially scattered sampling of lines in each segment, the memory access monitoring component 113 can use a 1:1 randomization function (such as a Feistel network) and a sequential counter (common counter, or per-segment counter). Using a randomizing function can reduce the spatial correlation between heavily accessed lines. The randomizing function can be an invertible function that maps the logical address of each line to an intermediate address. The memory access monitoring component 113 can then use the intermediate address space to select the lines to monitor. For example, a Feistel network is a symmetric structure used in cryptography to construct block ciphers. The memory access monitoring component 113 can use the one-to-one mapping generated by a Feistel network for address-space randomization. In some embodiments, the memory access monitoring component 113 can release ownership of a line after a predetermined time period and request ownerships of another randomly selected line, to avoid monitoring infrequently accessed (e.g., "cold") lines and missing highly active lines.

In some embodiments, the number n of lines per segments for the memory access monitoring component 113 has acquired ownership can be dynamic, and can change based on a triggering event or on a predetermined schedule. For example, the schedule can balance the latency created by monitoring a large subset of lines with the desire to have a more accurate view of the system-wide memory telemetry. As another example, the reported memory telemetry can fall below an accuracy threshold condition, and as a result, the memory sub-system controller can increase the number n of lines being monitored. Conversely, the memory sub-system controller can decrease the number n of lines being monitored, according to a schedule or responsive to a triggering event. In some embodiments, the memory access monitoring component 113 can monitor all lines of each segment 311A-X.

During initialization of the telemetry-capable memory sub-system 210A-B, the access counters per segment 330 are reset to zero. The access counters per segment 330 can be a counter array, in which each counter in the array corresponds to one moveable segment 311A-X (e.g., one page of cache).

FIG. 3B illustrates an example of memory access monitoring component 113 during runtime, in accordance with some embodiments of the present disclosure. In some embodiments, during runtime, the memory access monitoring component 113 monitors local processor reads and writes as well as host coherence messages. Responsive to identifying these commands and messages (i.e., responsive to receiving an access notification from the host system 120), the access counters per segment 330 are increased according to a weighting factor. As illustrated in FIG. 3B, the memory access monitoring component 113 receives a host access notification (340) for a line of segment 311C for which memory access monitoring component 113 had acquired ownership. As a result, the memory access monitoring component 113 increases the access counter 330 corresponding to segment 311C, releases ownership of the line of segment 311C (to allow the host system 120 to carry-out the command), and randomly selects a new line within segments 311C to monitor (350). As a result, the memory access monitoring component 113 is consistently monitoring n lines per segment 311A-X (in this example, n is 2 lines).

The memory access monitoring component 113 can increase the access counter per segment 330 by a weighting factor. The weighting can be based on the state of the line, the command associated with the request for access (i.e., the access type), and/or the number of lines n per segment 311A-X for the memory access monitoring component 113 has acquired ownership as compared to the total number of lines in the segment 311A-X. The state of line can refer to the ownership, exclusive, or shared state of the line of cache, and can be determined based on the cache coherence protocol implemented by coherent cache controllers 124, 114. In some cache coherence protocols (e.g., in the MESI protocol), lines can have the following states: modified (M), exclusive (E), shared (S), and/or invalid (I). Modified state indicates that the cache line is present only in the current cache and is dirty. That is, the cache is required to write the data back to main memory before permitting another read of the (no longer valid) main memory state. Exclusive state indicates that the cache line is present only in the current cache, and is clean (i.e., it matches what is stored in main memory). Shared state indicates that the cache line may be stored in other caches and is clean. Invalid state indicates that the cache line is invalid (i.e., not present in the cache).

Furthermore, in some embodiments, the access type associated with the command or with the access notification can be a processor read (the processor requests to read a line), a processor write (the processor requests to write a line), a bus read (e.g., a BusRd command, which is a snooped request indicating that there is a read request to a line requested by another processor), a bus read for ownership (e.g., a BusRdX command, which is a snooped request indicating that there is a possible write request to a line requested by another processor that does not already have the line), or a bus upgrade (e.g., a BusUpgr command, which is a snooped request indicating that there is a write request to a line requested by another processor that resides in its own cache). In some embodiments, the access type can be a flush command (a snooped request indicating that an entire cache line is written back to the main memory by another processor), or FlushOpt command (a snooped request indicating that an entire line is posted on the bus in order to supply it to another processor, i.e., a cache-to-cache transfer). Note that the access counters 330 may not be increased responsive to a Flush or FlushOpt command. A processor read and a processor write (or read for ownership) are initiated within the same memory sub-system that the memory access monitoring component 113 operates. Thus, the memory access monitoring component 113 can identify each processor read and processor write executed within the memory sub-system. The bus read, bus write, and/or bus upgrade are commands initiated from a system external to the memory sub-system in which the memory access monitoring component 113 operates. The MESI protocol outlines state transitions in response to various processor and/or bus operations. Note that other coherence protocols may be used by the memory access monitoring component 113.

Because the memory access monitoring component 113 has acquired ownership of n lines per segment 311A-X, the memory access monitoring component 113 receives an access notification each time a system issues a command directed to one of the n owned lines per segment 311A-X. To extrapolate the access count for each segment 311A-X based on the number of accesses directed to the n owned lines in each segment 311A-X, the memory access monitoring component 113 can post-process the access counter values 330. When the number of lines (n) being monitored per segment 311A-X is a subset of the total number of lines (l) per segment 311A-X, the memory access monitoring component 113 can adjust the access counter values 330 to predict the absolute access count. Since the memory access monitoring component 113 is consistently monitoring n number of lines out of/lines per segment 311A-X, to extrapolate from the fraction of lines monitored to include the expected access frequency to the non-monitored lines, the access counter values 330 are multiplied by a factor of l/n. This simple extrapolation factor suffices when the lines being monitored are not shared by other processors.

Shared data cached by multiple processors can introduce additional coherence probes, which can cause an imbalance in the ratio of lines triggering probes per segment 311A-X. To properly scale the statistics when data is shared, the memory access monitoring component 113 can apply a runtime weighting to the access counters 330 according to the values in Table 1.

TABLE 1

| Command | State | | | |
|---|---|---|---|---|
| | Modified (M) | Exclusive (E) | Shared (S) | Invalid (I) |
| Processor Read (PrRd) | R += 1 | R += 1 | R += 1 | R += 1 |
| Processor Write (PrWr) | W += 1 | W += 1 | W += 1 | W += 1 |
| Bus Read (BusRd) | R += L/N_EM | R += L/N_EM | | R += 1 |
| Bus Write (BusRdX) | W += L/(N_S + N_EM) | W += L/N_S + N_EM) | W += L/(N_S + N_EM) | W += 1 |
| Bus Upgrade (Bus Upgr) | | | W += L/(N_S + N_EM) | W += 1 |

In the above table, R represents the segment read counter value, and W represents the segment write counter value. L represents the total number of lines per segment 311A-X. N represents the number of lines owned per segment 311A-X (e.g., as illustrated by 320 in FIG. 3A). N_S represents the number of the n lines in the segment in the shared state. N_EM represents the number of the n owned lines in the segment in the exclusive or modified state.

Processor read and processor write commands (PrRd and PrWr) represent uncached reads and writes issued by a host processor, or reads and write issued by a near-data processor within the memory device. In the MESI protocol, the memory access monitoring component 113 can acquire ownership of a line by issuing a read for ownership operation. The read for ownership operation (e.g., a BuxRdX) combines a read and an invalidate broadcast. Thus, the operation causes all other caches to set the state of the line of invalid. If another processor intends to write to the memory address referenced by the line, the other processor can issue a read for ownership operation. The memory access monitoring component 113 then releases ownership of the line, and can automatically request ownership of another line in the segment. In some embodiments, the memory access monitoring component 113 can release ownership of a line by updating the state of the line to modified or shared. In some embodiments, the memory access monitoring component 113 can maintain a cache coherence directory data structure. The cache coherence directory data structure can maintain the state of a line, such as invalid, shared, modified, exclusive, and/or owned. The memory access monitoring component 113 can add new states to reflect additional whether the data is stored in a local cache or not (e.g., "Device-Owned-Local" state and "Device-Owned-Remote" state). The additional state can be a single bit, for example. The memory access monitoring component 113 can indicate which lines are owned using the cache coherence directory data structure, and can release a line by updating the state of the line in the cache coherence directory data structure.

Figure 4:
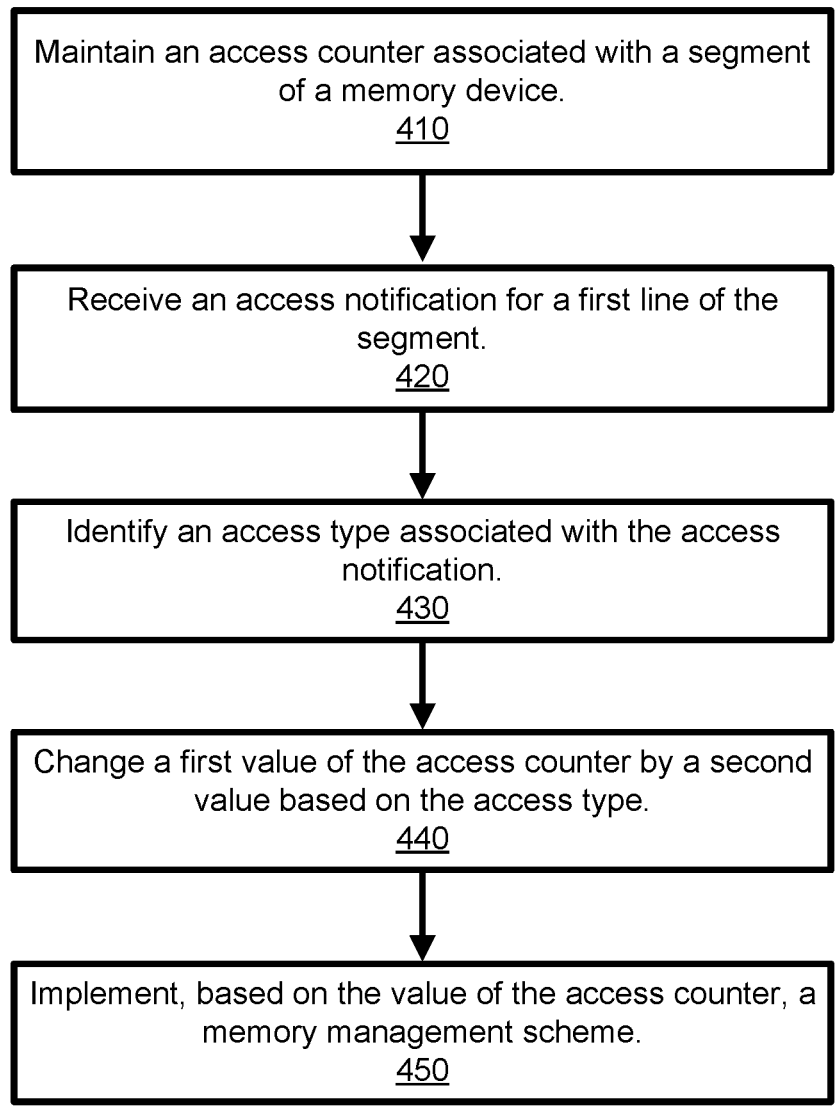
FIG. 4 is a flow diagram of an example method to monitor system-wide memory accesses, in accordance with some embodiments of the present disclosure

FIG. 4 is a flow diagram of an example method 400 to monitor system-wide memory accesses, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the memory access monitoring component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic maintains an access counter associated with a segment of a memory device (e.g., access counters 330 of FIGS. 3A-B). The segment can be a page, a block, a superblock, or some other segment of memory of the memory device. The access counter can be associated with a structure ID, a process ID, and/or virtual machine (VM) ID, for example. The processing logic can receive a monitor ID that is associated with the access counter for the segment, and that the host system can use to query the access counter value. In one embodiment, the processing logic maintains the access counters in local memory 119 of the memory sub-system controller 115 of FIG. 1 (and/or in local memory 219A,B of FIG. 2).

At operation 420, the processing logic receives an access notification for a first line of the segment. The processing logic can be monitoring the first line of the segment, and the first line can be randomly selected from the lines in the segment. In some embodiments, the access notification is received from the memory device, in which case non-coherent monitoring may be implemented. In some embodiments, the processing logic sends a request to a host system, such as host system 120, for ownership of the first line of the segment, and the access notification is received from the host system, in which case coherent monitoring may be implemented.

In some embodiments, responsive to receiving the access notification and/or responsive to the expiration of a pre-defined time period, the processing logic releases ownership of the first line of the segment, and requests ownership of a second line of the segment from the host system. The second line can be randomly selected. In some embodiments, the processing logic can keep track of the lines randomly selected for ownership, and can avoid selecting the same line twice within a certain time period.

In some embodiments, the processing logic can maintain a cache coherence directory. The directory can be recorded in metadata bits associated with the address of the line, for example. The cache coherence directory can indicate whether the line is invalid, modified, shared, exclusive, owned, and/or another state. In some embodiments, the processing logic can add a state to indicate whether the line is owned but not cached locally. For example, a state of "device-owned-local" indicates that the line is owned by the memory sub-system and is stored at a memory device within the memory sub-system, but is not stored in cache. A state of "device-owned-remote" indicates that the line is owned by the memory sub-system and is stored at a memory device not within the memory sub-system, and it is not stored in cache. To release ownership of the first line, the processing logic can update the state of the line by removing the indication that the first line is owned. In some embodiments, the processing logic can change the state of the line from invalid to modified or shared to indicate that the ownership of the first line has been released. In one embodiment, the processing logic maintains the cache coherence directory in local memory 119 of the memory sub-system controller 115 of FIG. 1 (and/or in local memory 219A,B of FIG. 2). In some embodiments, the cache coherence directory is recorded in metadata bits associated with the memory address of the line (e.g., the physical address or the logical address).

At operation 430, the processing logic identifies an access type associated with the access notification. The access type can be, for example, a bus read, a bus write, a bus upgrade, a processor read, or a processor write. In one embodiment, the access type is specified in the access notification (e.g., as a value in a header or other portion of the notification).

At operation 440, the processing logic changes (e.g., increases) a first value of the access counter by a second value based on the access type. The access counter can correspond to the structure ID, process ID, VM ID (or some other identifier) specified in the access notification. The second value can be weighted based on a total number of lines in the segment and the number of lines in the segment for which the memory sub-system controller has ownership. For non-coherent monitoring (i.e., for processor read commands or processor write commands), the second value can be weighted based on the total number of lines in the segment divided by the number of lines in the segment being monitored (e.g., owned). For coherent monitoring (i.e., for bus read commands, bus write commands, or bus upgrade commands), the second value can be weighted according to Table 1. The state of the line and/or the state of the segment can be maintained in a cache coherency data structure, or in metadata associated with the segment. After changing the counter value, the processing logic can transition the state of the segment according to the appropriate cache coherent protocol.

At operation 450, the processing logic implements a memory management scheme based on the value of the access counter. The memory management scheme can optimize memory usage for the entire memory sub-system, or for a subset of the memory sub-system. The memory management scheme can include a page scheduling technique, an application optimization technique, a security monitoring technique, a virtual machine provisioning technique, and/or a cache sizing technique, for example. The processing logic can implement one or a combination of these memory management techniques if the access counter satisfies a certain criterion (e.g., exceeds or falls below a corresponding threshold value), and/or on a predetermined schedule. For example, the processing logic can implement a page scheduling technique that corresponds to the current value of the access counter every 5 minutes, or once every 1 hour. These timeframes are illustrative only, and the processing logic can implement a memory management technique according to any predetermined schedule. As another example, if the access counter associated with a segment exceeds a predefined threshold value (indicating that the segment has been accessed a high number of times), the processing logic update the data placement technique for that segment.

A page scheduling technique can involve relocating heavily accessed segments (i.e., segments for which the access counter value exceeds a threshold value) to faster memory devices to improve the overall performance of the memory sub-system. In some embodiments, page scheduling can include generating lists of the moveable segments, and ordering the list in order of access frequency or access counter value. The processing logic can then rearrange the segments according to the access frequency or access count value, e.g., moving the most frequently access segments in the fastest memory type. The processing logic can move the least frequently accessed segments to the slowest memory type. An application optimization technique can involve rearrange an application's data within the memory sub-system to optimize performance of the application. Because an application's data may be split across several memory device (either within a single memory sub-system or between multiple memory sub-systems), using a system-wide access counter to optimize data placement can lead to improved application performance. A security monitoring technique can involve monitoring data accesses among other applications. The processing logic can use the data access counter to determine when an application is accessing a segment maliciously (e.g., the application may not have permission to access the segment). A VM provisioning technique can involve identifying available resources for VM provisioning based on a segment counter value. A data placement technique can involve identifying frequently access data (e.g., "hot" data) and moving the frequently accessed data to the most appropriate memory device (e.g., a faster memory device within the memory sub-system), or identifying infrequently access data (e.g., "cold" data) and moving the infrequently accessed data to the most appropriate memory device (e.g., a slower memory device within the memory sub-system). A cache sizing technique can involve determining what size on-chip cache or off-chip (DRAM) page cache to use based on the access counter value.

In some embodiments, the processing logic transmits, to the host system, the counter value. In some embodiments, the processing logic can transmit the counter value to the host system responsive to a triggering event. For example, the triggering event can occur once the counter value reaches a specified threshold value. As another example, the processing logic can receive a request from the host system to transmit the counter value. As another example, the processing logic can transmit the counter to the host system on a predetermined schedule (e.g., every few minutes, or one every hour). In some embodiments, the processing logic can reset the counter values to zero, responsive to a command from the host system, and/or responsive to a triggering event. For example, the processing logic can reset the counter values to zero responsive to transmitting the counter values to the host system.

In some embodiments, the processing logic can receive a snapshot command from the host system. As a result, the processing logic can save a snapshot of the current access counter values to a buffer. In some embodiments, the processing logic can receive a post-processing command from the host system. As a result, the processing logic can implement memory management capabilities using the access counter values of multiple segments. The processing logic can generate a sorted or unsorted block access frequency histogram, a page schedule using a page scheduling policy, an expected hit rate for a given cache size from reuse distance monitor, and/or a cache size needed to reach a given hit rate from reuse distance monitor. The processing logic can then transmit the generated memory management features to the host system.

Figure 5:
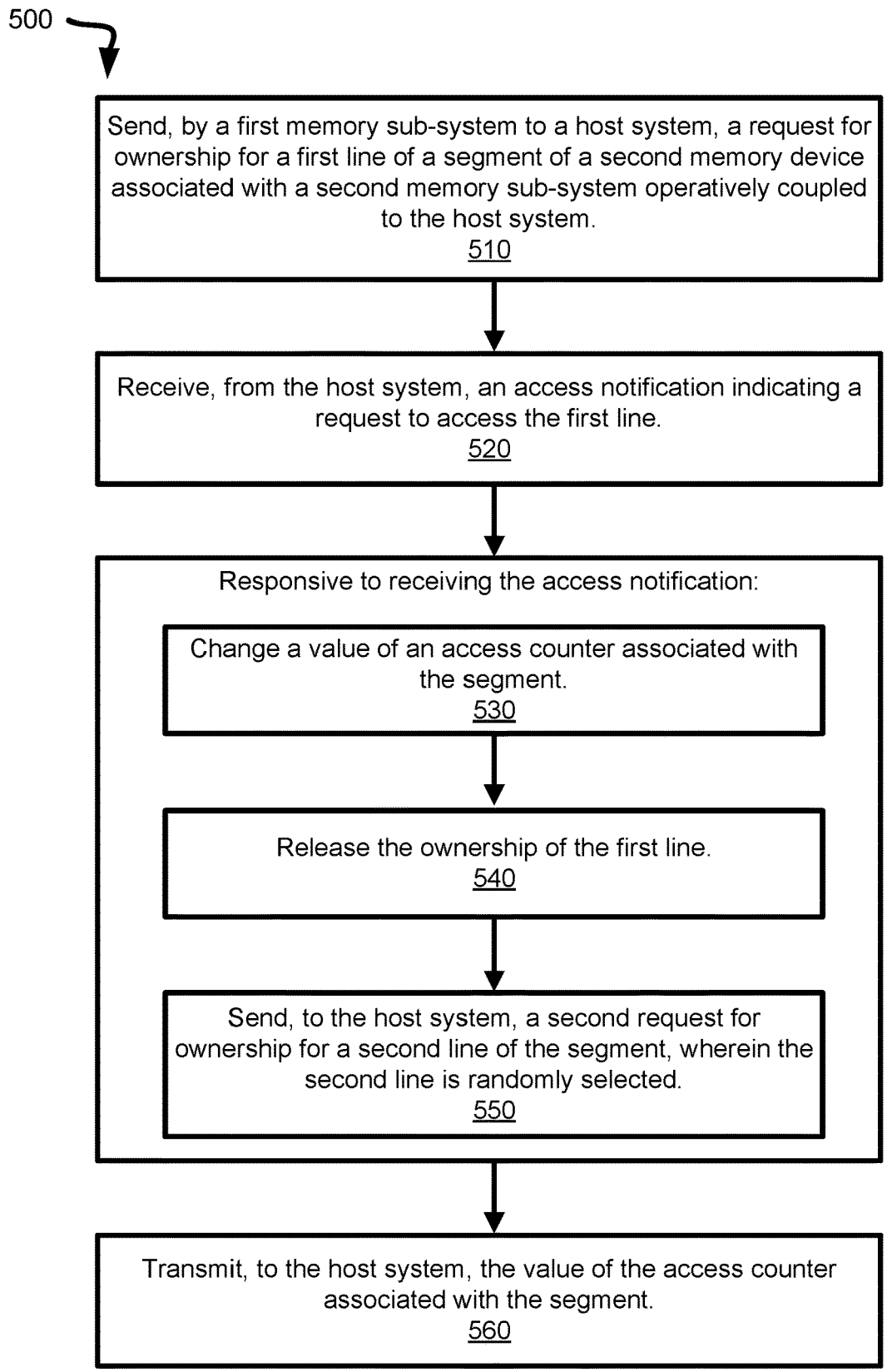
FIG. 5 is a flow diagram of an example method to monitor memory accesses with cache snooping, in accordance with some embodiments of the present disclosure.

FIG. 5 is a flow diagram of an example method 500 to monitor memory accesses with cache snooping, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the memory access monitoring component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic in a first memory sub-system sends, to a host system, a request for ownership for a first line of a segment of a memory device associated with a second memory sub-system operatively coupled to the host system. The segment can be a page, a block, a superblock, or some other segment of memory of a memory device in the second memory sub-system. The processing logic can randomly select the first line from the lines in the segment. In some embodiments, the processing logic can keep track of the lines randomly selected for ownership, and can avoid selecting the same line twice within a certain time period. The first memory sub-system can be capable of monitoring memory telemetry data, and the second memory sub-system can be incapable of monitoring memory telemetry data.

At operation 520, the processing logic receives, from the host system, an access notification indicating a request to access the first line. The access notification can specify the access type (e.g., as a value in a header or other portion of the notification). The access type can be, for example, a bus read, a bus write, or a bus upgrade. Responsive to receiving the access notification, the processing logic can perform operations 530-550. At operation 530, the processing logic increases a value of an access counter associated with the segment. The access counter can be associated with a structure ID, a process ID, a virtual machine (VM) ID, or some other identifier specified in the access notification. The processing logic can increase the value of the access counter based on the access type of the access notification (i.e., by a second value associated with the access type). The second value can be weighted based on the total number of lines in the segment and a number of lines in the segment for which the first memory sub-system has ownership. In some embodiments, the second value can be weighted according to Table 1. The state of the line and/or the state of the segment can be maintained in a cache coherency data structure, or in metadata associated with the segment. After increasing the counter value, the processing logic can transition the state of the segment according to the appropriate cache coherent protocol.

At operation 540, the processing logic releases the ownership of the first line. In some embodiments, the processing logic can release ownership of the first line in response to a triggering event. The triggering event can be receiving a read for ownership operation (e.g., a BuxRdX) from another processor, for example. Responsive to receiving the read for ownership from another operation, the state of the line can change to invalid, and thus the processing logic can release ownership. In some embodiments, the change in the state of the line (from modified, exclusive, or shared to invalid) causes the processing logic to release ownership.

In some embodiments, the processing logic can maintain a coherence directory data structure indicating the state of the line. The state of the line can be owned, device-owned-local, or device-owned-remote, for example. The device-owned-local state indicates that first memory sub-system controller has ownership of the line, but the data may not currently be stored at a cache on the first memory sub-system controller. The device-owned-remote state indicates that the first memory sub-system controller has ownership of the line, and that the first memory sub-system does not have a local cache in which to store the data. In some embodiments, the first memory sub-system controller can execute a proxy read to retrieve the data stored at the line. In some embodiments, the first memory sub-system controller can hold the data stored at the owned line in a reserved portion of memory on the corresponding memory sub-system 210A, B, e.g., in a hash table indexed by physical address. To release the ownership of the line, the processing logic can update the state of the line in the data structure by removing the owned indication. For example, the processing logic can update the state to not owned by removing the "owned" indicator. In one embodiment, the processing logic maintains the coherence directory in local memory 119 of the memory sub-system controller 115 of FIG. 1 (and/or in local memory 219A,B of FIG. 2). In some embodiments, the coherence directory is recorded in metadata bits associated with the memory address of the line (e.g., the physical address or the logical address).

At operation 550, the processing logic sends, to the host system, a second request for ownership for a second line of the segment. The second line can be randomly selected. In some embodiments, the processing logic can release ownership of the first line and request ownership of a second, randomly selected line at the expiration of a pre-defined time period.

At operation 560, the processing logic transmits, to the host system, the value of the access counter associated with the segment. In some embodiments, the processing logic can transmit the access counter value to the host system responsive to triggering event. For example, the triggering event can be once the access counter value reaches a specified threshold value. As another example, the processing logic can receive a request from the host system to transmit the access counter value. As another example, the processing logic can transmit the access counter to the host system on a predetermined schedule (e.g., every few minutes, or one every hour). In some embodiments, the processing logic can reset the access counter values to zero, responsive to a command from the host system, and/or responsive to a triggering event. For example, the processing logic can reset the access counter values to zero responsive to transmitting the access counter values to the host system.

In some embodiments, the processing logic can receive additional counter values associated with additional memory sub-systems. The additional memory sub-systems can be memory sub-systems capable of monitoring memory telemetry data. The processing logic can combine the additional counter values with the value of the access counter associated with the segment. In embodiments, the processing logic can combine the additional counter values with values of access counters associated with each segment in memory devices operatively coupled to the first memory sub-system. The processing logic can then transmit, to the host system, the combination of the additional counter values and the access counter value of the segment.

In some embodiments, the processing logic can receive a snapshot command from the host system. As a result, the processing logic can save a snapshot of the current access counter values to a buffer. In some embodiments, the processing logic can receive a post-processing command from the host system. As a result, the processing logic can implement memory management capabilities using the access counter values of multiple segments. The processing logic can generate a sorted or unsorted block access frequency histogram, a page schedule using a page scheduling policy, an expected hit rate for a given cache size from reuse distance monitor, and/or a cache size needed to reach a given hit rate from reuse distance monitor. The processing logic can then transmit the generated memory management features to the host system.

Figure 6:
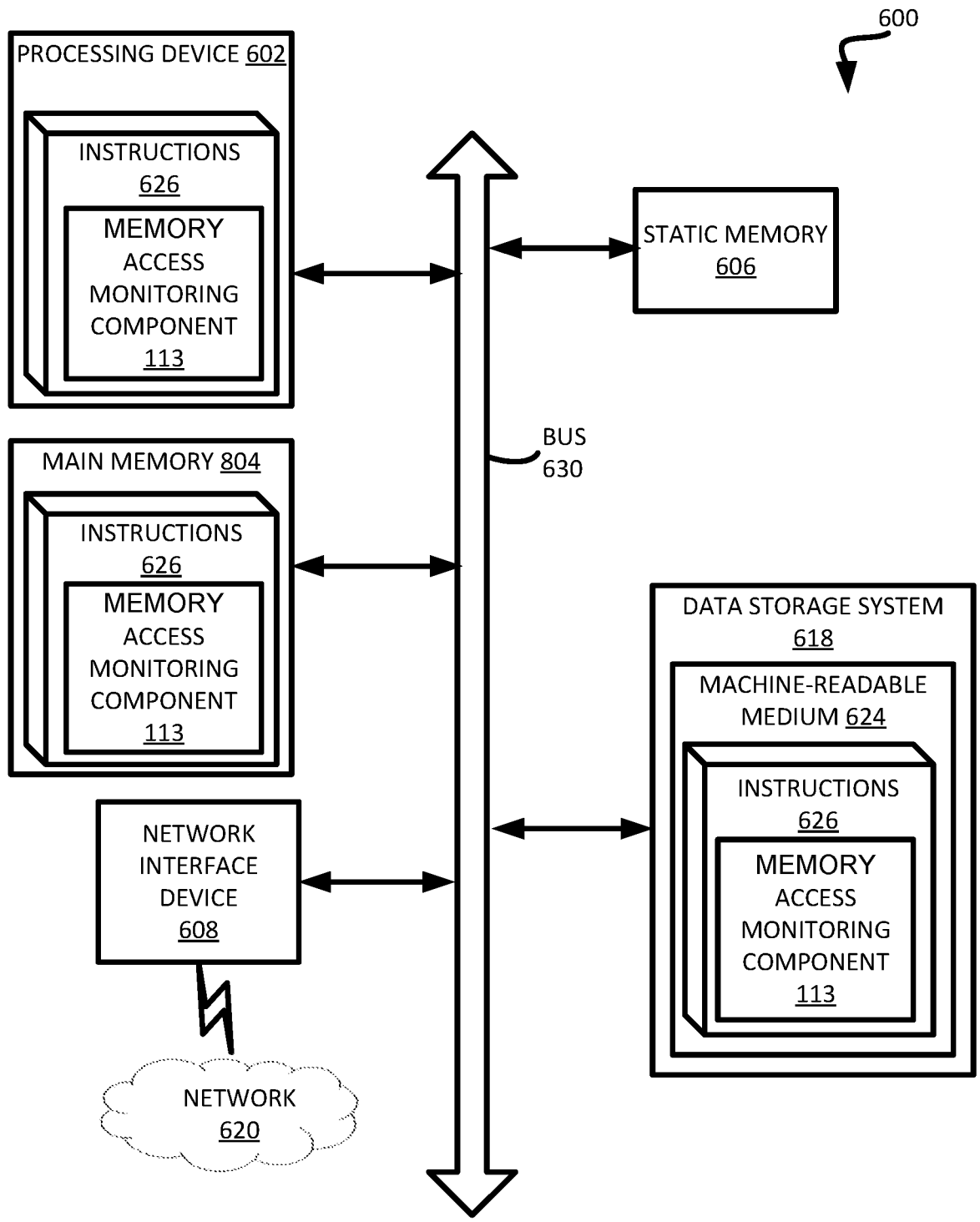
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the memory access monitoring component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a memory access monitoring component (e.g., the memory access monitoring component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   maintaining an access counter associated with a segment of a memory device;
   receiving an access notification for a first line of the segment;
   identifying an access type of the access notification;
   changing a first value of the access counter by a second value, wherein the second value is based on the access type of the access notification; and
   implementing, based on the first value of the access counter, a memory management scheme.

2. The method of claim 1, wherein the memory management scheme comprises at least one of: a page scheduling technique, an application optimization technique, a security monitoring technique, a virtual machine provisioning technique, or a cache sizing technique.

3. The method of claim 1, further comprising:
   transmitting, to a host system, the first value of the access counter.

4. The method of claim 1, wherein a memory sub-system controller is monitoring the first line of the segment, and wherein the first line is randomly selected.

5. The method of claim 1, further comprising:
   sending, to a host system, a request for ownership of the first line of the segment; and
   wherein the access notification is received from the host system.

6. The method of claim 5, further comprising:
   releasing the ownership of the first line of the segment; and
   sending, to the host system, a second request for ownership of a second line of the segment, wherein the second line is randomly selected.

7. The method of claim 1, wherein the second value is weighted based on a total number of lines in the segment and a number of lines in the segment for which a memory sub-system controller has ownership.

8. The method of claim 1, wherein the access type comprises one of: a bus read, a bus write, a bus upgrade, a processor read, or a processor write.

9. A first memory sub-system comprising:
   a memory device; and
   a processing device, operatively coupled to the memory device, to perform operations comprising:
   sending, to a host system, a request for ownership for a first line of a segment of a second memory device associated with a second memory sub-system, wherein the second memory sub-system is operatively connected to the host system;
   receiving, from the host system, an access notification indicating a request to access the first line; and
   responsive to receiving the access notification, changing a value of an access counter associated with the segment.

10. The first memory sub-system of claim 9, wherein the operations further comprise:
    releasing the ownership of the first line; and
    sending, to the host system, a second request for ownership for a second line of the segment, wherein the second line is randomly selected.

11. The first memory sub-system of claim 9, wherein the operations further comprise:
    transmitting, to the host system, the value of the access counter associated with the segment.

12. The first memory sub-system of claim 9, wherein the operations further comprise:
    receiving one or more values of additional counters associated with additional memory sub-systems;
    combining the one or more values of additional counters with the value of the access counter associated with the segment; and
    transmitting, the host system, the combination of the one or more values of additional counters with the value of the access counter associated with the segment.

13. The first memory sub-system of claim 9, wherein the first memory sub-system is capable of monitoring memory telemetry data, and wherein the second memory sub-system is not capable of monitoring memory telemetry data.

14. The first memory sub-system of claim 9, wherein the first line is randomly selected.

15. The first memory sub-system of claim 9, wherein changing the value of the access counter associated with the segment comprises:
    determining an access type associated with the access notification; and
    increasing the value of the access counter by a second value associated with the access type, wherein the second value is weighted based on a total number of lines in the segment and a number of lines in the segment for which the first memory sub-system has ownership.

16. The first memory sub-system of claim 15, wherein the access type associated with the access notification comprises at least one of: a bus read, a bus write, or a bus upgrade.

17. The first memory sub-system of claim 9, wherein the operations further comprise:
responsive to an expiration of a time period, releasing the ownership of the first line of the segment; and
sending, to the host system, a second request for ownership for a second line of the segment, wherein the second line is randomly selected.

18. A non-transitory computer-readable storage medium comprising instructions that, when executed by a processing device, cause the processing device to perform operations comprising:
maintaining an access counter associated with a segment of a memory device;
receiving an access notification for a first line of the segment;
identifying an access type of the access notification;
changing a first value of the access counter by a second value, wherein the second value is based on the access type of the access notification; and
implementing, based on the first value of the access counter, a memory management scheme.

19. The non-transitory computer-readable storage medium of claim 18, wherein the memory management scheme comprises at least one of: a page scheduling technique, an application optimization technique, a security monitoring technique, a virtual machine provisioning technique, a data placement technique, or a cache sizing technique.

20. The non-transitory computer-readable storage medium of claim 18, wherein the processing device is to perform operations further comprising:
sending, to a host system, a request for ownership of the first line of the segment, wherein the first line is randomly selected, and wherein the access notification is received from the host system; and
responsive to receiving the access notification, performing:
releasing the ownership of the first line of the segment; and
sending, to the host system, a second request for ownership of a second line of the segment, wherein the second line is randomly selected.

* * * * *